United States Patent [19]

Arnaud

[11] 3,762,794
[45] Oct. 2, 1973

[54] ADJUSTABLE BEAM REFOCUSER AND REDIRECTOR
[75] Inventor: Jacques Alexis Arnaud, Colts Neck, N.J.
[73] Assignee: Bell Telephone Laboratories, Incorporated, Murray Hill, N.J.
[22] Filed: Apr. 6, 1972
[21] Appl. No.: 241,516

Related U.S. Application Data
[63] Continuation-in-part of Ser. No. 887,262, Dec. 22, 1969, abandoned.

[52] U.S. Cl. .................... 350/7, 350/294, 350/301
[51] Int. Cl. ........................................... G02b 17/00
[58] Field of Search ...................... 350/190, 7, 286, 350/231, 294, 293, 301, 302; 250/199

[56] References Cited
UNITED STATES PATENTS
3,224,330   12/1965   Kompfner ......................... 350/294
2,970,518   2/1961    Ross ................................. 350/294
2,697,379   12/1954   Walker ............................. 350/294
2,559,972   7/1951    Kirkpatrick ...................... 350/294

Primary Examiner—David Schonberg
Assistant Examiner—Michael J. Tokar
Attorney—W. L. Keefauver

[57] ABSTRACT

Optical beam refocusing and redirecting are realized using two identical cylindrical mirrors arranged in a periscopic configuration. The focal length of the system and the deflection angle can be made continuously and independently variable by relating the parameters of the system in a specified manner.

4 Claims, 4 Drawing Figures

PATENTED OCT 2 1973
3,762,794

INVENTOR
J. A. ARNAUD
BY
*Sylvan Sherman*
ATTORNEY

3,762,794

ADJUSTABLE BEAM REFOCUSER AND REDIRECTOR

This application, which relates to optical beam redirectors and refocusers, is a continuation-in-part of my copending application Ser. No. 887,262, filed Dec. 22, 1969, now abandoned.

BACKGROUND OF THE INVENTION

The invention of the laser has revived interest in light as a communication carrier. However, before a light system can become economically and technically feasible, the problems of guided propagation of light beams over extended distances must be solved. From recent research on techniques for transmitting light waves over appreciable distances, it has become evident that the ability to control the direction of propagation is one of the more important and difficult of these many problems.

In free space, electromagnetic waves can travel in a straight line between transmitter and receiver. On the other hand, in a guiding medium buried in the earth, frequent changes in direction are necessary in order to follow vertical terrain contours and to conform to a horizontal path that avoids physical obstacles and regions of hight-cost installation. The waveguiding medium must provide these direction changes.

In U.S. Pat. No. 3,224,330, optical beam focusing and redirecting means are described using two cylindrical mirrors arranged in a periscopic configuration. It is, however, a disadvantage of the system described therein that the two mirrors are different, and that the direction of propagation can be changed effectively only by relatively small amounts since any such change tends to defocus the beam.

It is, accordingly, an object of the present invention to simplify the structure of cylindrical mirror, periscopic beam refocusers and redirectors.

Other objects of the present invention are to extend the range of angles over which a beam can be redirected without degrading the quality of the focusing, and to vary the focal length of the refocuser so as to control the beam size.

SUMMARY OF THE INVENTION

The present invention is based upon the recognition that two identical concave cylindrical mirrors, arranged in a periscopic configuration, can be used to focus a beam at any arbitrary point. Furthermore, the focal length of the system and the deflection angle can be made independently and continuously variable by relating the parameters of the system in the manner to be described in greater detail hereinbelow.

It is, thus, an advantage of the present invention that two identical mirrors are used, thereby reducing the number of different components that must be purchased and stocked in the construction and maintenance of an optical communication system. It is a further advantage of the invention that arbitrary changes in beam direction can be realized without any degradation in the focus obtained. In addition, the focal length of the system can be continuously varied within limits, independently of the angle of beam deflection.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
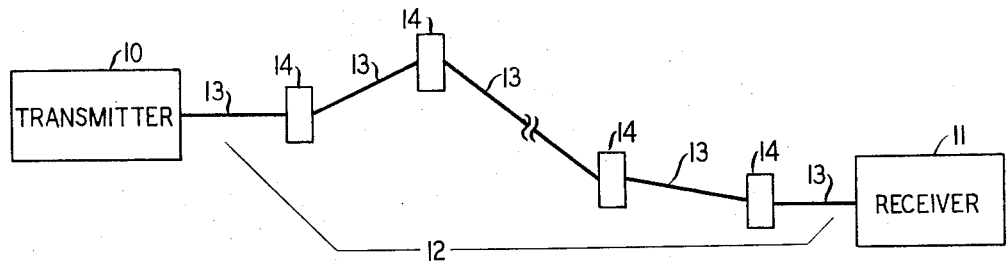
FIG. 1 shows, in block diagram, a typical optical transmission system.

Referring to the drawings, FIG. 1, included for purposes of explanation, shows an optical transmission system comprising a transmitter 10, a receiver 11 and a guided wavepath 12 connecting the transmitter to the receiver. In the communication system contemplated, the distance between transmitter and receiver will be long, typically of the order of many miles, and, hence, there will generally be many changes in direction in order to conform to the available right-of-ways, terrain undulations and to avoid natural obstructions. Thus, wavepath 12 is shown to include a plurality of straight sections of waveguide 13, arranged at varying orientations, and a plurality of beam deflectors and refocusers 14 for redirecting the optical wave energy from along one of said straight sections of waveguide to along the next adjacent straight section of waveguide.

The general requirements of an optical beam waveguide have been fully described in the literature. See, for example, "Effect of Redirectors, Refocusers, and Mode Filters on Light Transmission Through Aberrated and Misaligned Lenses," by E. A. J. Marcatili, published in the October 1967 issue of the *Bell System Telephone Journal*, pp. 1733 to 1752. The present invention relates specifically to the beam refocusers and redirectors 14.

Figure 2:
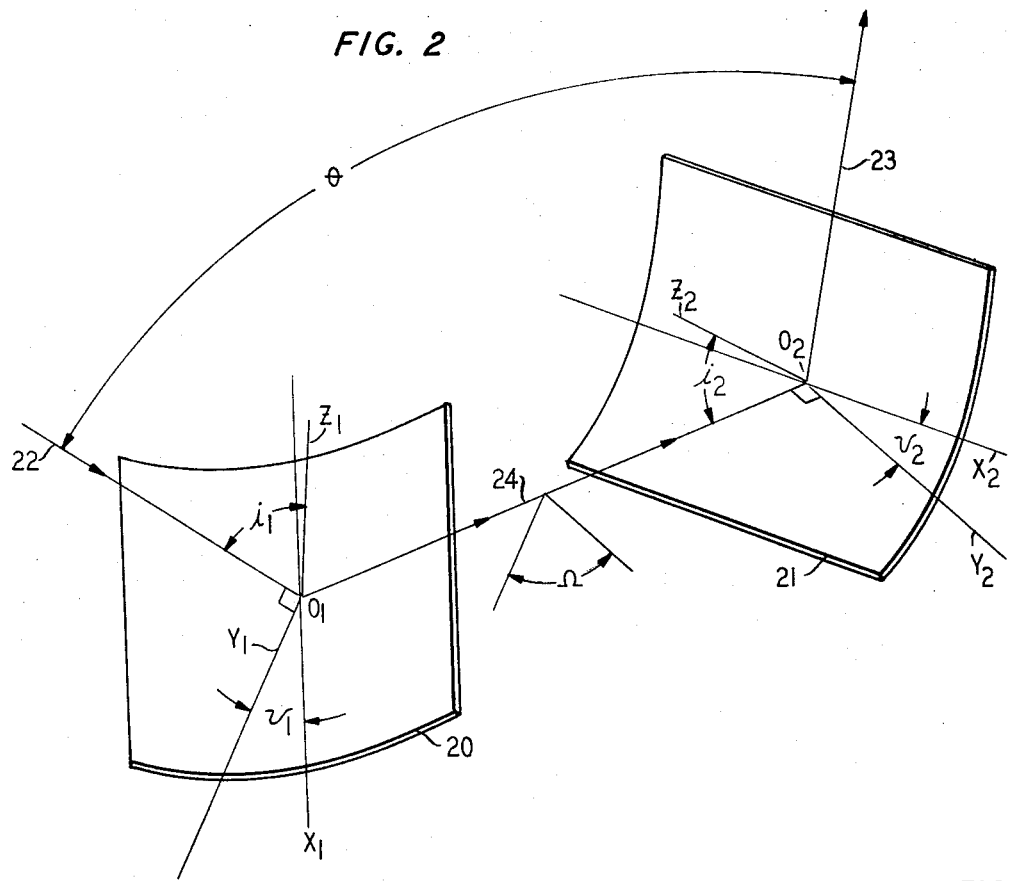
FIG. 2 shows a beam redirector-refocuser in accordance with the present invention.

FIG. 2 shows a redirector-refocuser, in accordance with the present invention, comprising two, closely-spaced cylindrical mirrors 20 and 21. For a redirector having a focal length, $f$, mirrors spaced apart approximately one-tenth the focal length or less would be considered "closely-spaced" within the present context.

The mirrors, which are identical, are characterized by their radius of curvature R and by their orientation relative to each other and to the optical beam. As shown in FIG. 2, an incident ray 22 is directed onto a point $O_1$ on mirror 20 at an angle of incidence $i_1$ with respect to the normal $Z_1$ to the mirror surface. The orientation of mirror 20 with respect to the normal to the incidence plane (i.e., the plane defined by ray 22 and normal $Z_1$) is given by the angle $v_1$ between normal $y_1$ and the mirror generatrix $X_1$.

The reflected ray 24 is similarly incident at a point $O_2$ on mirror 21 at an angle of incidence $i_2$ to mirror normal $Z_2$. The angle between the normal $y_2$ to the incidence plane and generatrix $X_2$ is given as $v_2$. The angle between the two incidence planes (i.e., the angle between $y_1$ and $y_2$) is indicated as $\Omega$, while the total deflection angle between the incident ray 22 and the redirected ray 23 is $\theta$.

The most general relationships among the several parameters of the refocuser-redirector shown in FIG. 2 are given by $$f = (R/2) [\cos i_1 \sin^2\nu_1 + (\cos^2\nu_1/\cos i_1)]^{-1}$$
$$= (R/2) [\cos i_2 \sin^2\nu_2 + (\cos^2\nu_2/\cos i_2)]^{-1};$$

(1)

$$\Omega = \tan^{-1}(\tan \nu_1 \cos i_1) + \tan^{-1}(\tan \nu_2 \cos i_2) \pm \pi/2;$$

(2)

and $$\cos \theta = \cos 2i_1 \cos 2i_2 - \cos \Omega \sin 2i_1 \sin 2i_2;$$

(3)

where $f$ is the effective focal length of the two mirror systems.

These equations can be simplified if it is further specified that the angles of incidence at the two mirrors shall be equal. That is $$i_1 = i_2 \equiv i.$$

(4)

This condition is required if the range of permissible deflection angles is to include zero (no deflection) and other values close to zero. Making this substitution, we further find from equation (1) that $$\nu_1 = \pm\nu_2.$$

(5)

Substituting (4), and the case $\nu_1 = \nu_2 \equiv \nu$ of (5) in equations (1), (2) and (3), we obtain for the latter $$f = (R/2) [\cos i \sin^2\nu + (\cos^2\nu/\cos i)]^{-1},$$

(6)

$$\Omega = (\pi/2) + 2\tan^{-1}(\tan \nu \cos i),$$

(7)

and $$\cos \theta = \cos^2 2i - \cos \Omega \sin^2 2i.$$

(8)

Thus, for a given set of mirrors having a radius of curvature $R$, the required focal length $f$ and deflection angle $\theta$ can be specified, and the values for $i$, $\nu$ and $\Omega$ determined, thereby completely defining the system. There are, however, a number of practical considerations which place practical limitations upon the system. For example, as the angle of incidence is made smaller, there is a tendency for the mirrors to interfere with the beam. On the other hand, as the angle of incidence increases, the beam size decreases correspondingly. Thus, as a practical matter, the angle of incidence is limited within a range which will vary from system to system depending upon the size of the mirrors and the size of the beam.

Figure 3:
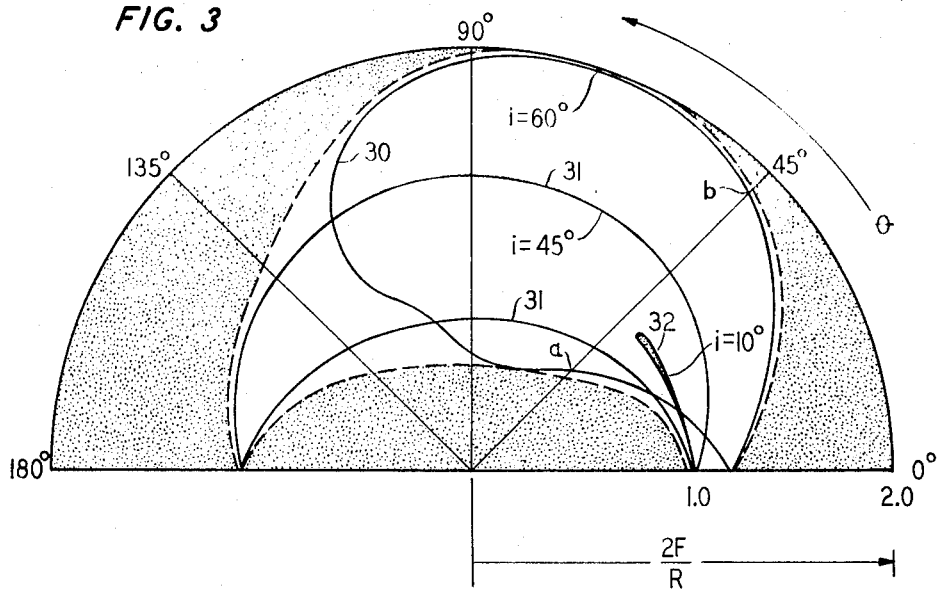
FIG. 3, included for purposes of illustration, shows the range of focal lengths and deflection angles that can be realized for incidence angles between 10° and 60°.

For purposes of illustration, a range of incidence angles between 10° and 60° was considered, and the focal lengths computed for different deflection angles. Curve 30 in FIG. 3 shows the results of these computations for $i = 60°$. As can be seen, for a deflection angle of 45°, there are two permissible focal lengths, identified by points $a$ and $b$. Similarly, curve 31 shows the range of solutions for $i = 45°$, while curve 32 gives the solutions for $i = 10°$. More generally, the total range of solutions is given by all the points within the unshaded area. The shaded area represents the solutions that, for the practical reasons stated above, cannot be realized.

The solutions described above are for the case $\nu_1 = \nu_2$. A second class of solutions of equations (1), (2) and (3), obtained for $\nu_1 = -\nu_2 \equiv \nu$, yields $$f = (R/2) [\cos i \sin^2\nu + (\cos^2\nu/\cos i)]^{-1},$$

(9)

$$\Omega = \pi/2$$

(10)

and $$\cos \theta = \cos^2 2i.$$

(11)

Thus, for a given value of $\theta$, $f$ can be varied by changing $\nu$, the incident angle $i$ remaining constant. This solution covers, in particular, the area enclosed by curve 32 in FIG. 3, part of which is not covered by the previous solution. Both classes of solutions are, therefore, of interest.

Figure 4:
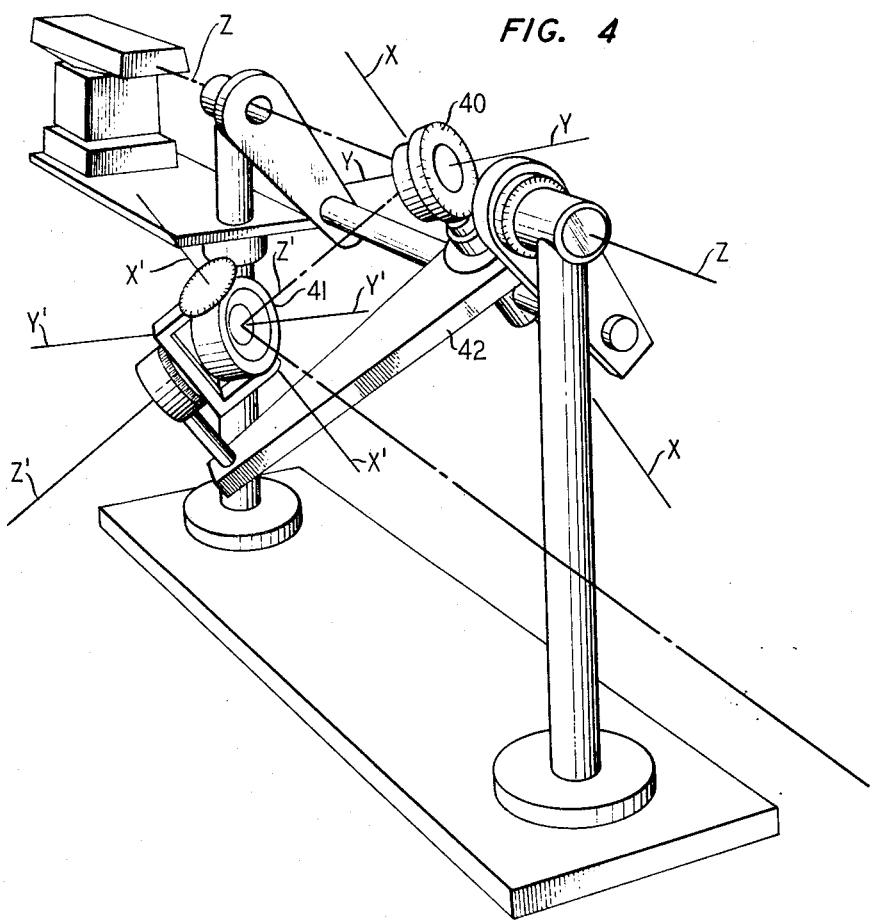
FIG. 4 shows an illustrative adjustable beam redirector-refocuser.

In most communication system applications the mirrors of the refocuser-redirector would be preset to provide the required beam focusing and redirecting. If, however, it is necessary or desirable to have a continuously variable system, each of the mirrors can be made adjustable as illustrated in FIG. 4.

In this arrangement, mirrors 40 and 41 are mounted at opposite ends of a bracket 42 which is rotatable about an axis X—X that is normal to the plane of incidence at mirror 40. The X—X axis, in addition to being perpendicular to bracket 42 passes through the center of mirror 40. To establish angles $i_1$ and $\nu_1$, mirror 40 is independently rotatable about the X—X axis and about a second axis Y—Y that is perpendicular to the surface of the mirror at the point of incidence of the beam center. For all practical purposes, the point of incidence can be considered to be the center of mirror 40.

Mirror 41 is similarly, simultaneously rotatable about a Z'—Z' axis which passes through the center of the mirror and is parallel to bracket 42; about an X'—X' axis which passes through the center of mirror 41 and is perpendicular to bracket 42; and about a Y'—Y' axis perpendicular to the center of mirror 41.

Having established the deflection angle $\theta$ by means of the above-described adjustments, the entire assembly is also rotatable about the Z—Z axis. The incident beam is, thereby, capable of being redirected along a cone having a cone angle $\theta$. Dials, calibrated in degrees, provide direct reading of the system parameters.

In summary, a system of the type described, comprising a pair of identical concave mirrors arranged in a periscopic configuration, is capable of redirecting an optical beam over a range of angles between zero and 180° inclusive, and for simultaneously refocusing the redirected beam. In addition, for any given deflection angle, the focal length of the redirected beam is continuously adjustable within a range of values. 11

In all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

I claim:

1. An optical beam transmission system including:

two spaced sections of beam waveguide having an arbitrary angular orientation relative to each other within the range of angles between zero and 180°;

and means for focusing and redirecting an optical beam received from one of said sections for transmission along the other of said sections comprising:

a pair of identical mirrors, each having a concave cylindrical reflecting surface, arranged in a periscopic configuration;

means for rotating one of said mirrors about a first axis that is normal to the incidence plane of said beam at said first mirror;

means for rotating the other of said mirrors about a second axis that is normal to the incidence plane of said beam at said other mirror;

means for rotating said first and second axes relative to each other;

means for rotating said one mirror about a third axis that is normal to the surface of said one mirror;

and means for rotating said other mirror about a fourth axis that is normal to the surface of said other mirror.

2. An optical beam redirector-refocuser comprising:

a pair of identical mirrors, each having a concave cylindrical reflecting surface of radius of curvature R, arranged in a periscopic configuration, the parameters of said system being related by $$f = (R/2)[\cos i_1 \sin^2 \nu_1 + (\cos^2 \nu_1/\cos i_1)]^{-1} = (R/2)[\cos i_2 \sin^2 \nu_2 + (\cos^2 \nu_2/\cos i_2)]^{-1};$$

$$\Omega = \tan^{-1}(\tan \nu_1 \cos i_1) + \tan^{-1}(\tan \nu_2 \cos i_2) \pm \pi/2;$$ and
$$\cos \theta = \cos 2i_1 \cos 2i_2 - \cos \Omega \sin 2i_1 \sin 2i_2;$$ where $i_1$ and $i_2$ are the angles of incidence of the beam at said mirrors;

$\nu_1$ and $\nu_2$ are the angles between the normals to the incidence planes and the mirror generatrices, where at least one of said angles is greater than zero;

$\Omega$ is the angle between the normals to the incidence planes;

$f$ is the focal length of the combined mirrors; and $\theta$ is the total beam deflection.

3. An optical beam transmission system including:

two spaced sections of beam waveguide whose longitudinal axes are oriented relative to each other at some arbitrary angle between zero and 180°;

and means for focusing and redirecting an optical beam received from one of said sections for transmission along the other of said sections comprising:

a pair of identical mirrors, each having a concave cylindrical reflecting surface, arranged in a periscopic configuration;

means for rotating one of said mirrors about a first axis that is perpendicular to the axis of one of said waveguides;

means for rotating the other of said mirrors about a second axis that is perpendicular to the longitudinal axis of the other of said waveguides;

means for rotating said first and second axes relative to each other;

means for rotating said one mirror about a third axis that is normal to the surface of said one mirror;

and means for rotating said other mirror about a fourth axis that is normal to the surface of said other mirror.

4. The redirector-refocuser according to claim 2 including means for rotating said mirrors relative to each other and relative to said optical beam.

* * * * *